(12) United States Patent
Lomax, Jr.

(10) Patent No.: US 7,195,059 B2
(45) Date of Patent: Mar. 27, 2007

(54) HEAT EXCHANGER AND METHOD OF PERFORMING CHEMICAL PROCESSES

(75) Inventor: Franklin D. Lomax, Jr., Arlington, VA (US)

(73) Assignee: H2Gen Innovations, Inc., Alexandria, VA (US)

( * ) Notice: Subject to any disclaimer, the term of this patent is extended or adjusted under 35 U.S.C. 154(b) by 35 days.

(21) Appl. No.: 10/429,689

(22) Filed: May 6, 2003

(65) Prior Publication Data
US 2004/0234432 A1 Nov. 25, 2004

(51) Int. Cl.
*F28D 7/00* (2006.01)
*F28F 1/30* (2006.01)
*F28D 7/16* (2006.01)

(52) U.S. Cl. .................. 165/157; 165/182; 165/159; 422/201

(58) Field of Classification Search ............ 165/104.19, 165/146, 157, 159, 181, 182, 54, 104.12; 422/138, 139, 198, 200–201; 423/655, 656; 429/120; 48/198.1
See application file for complete search history.

(56) References Cited

U.S. PATENT DOCUMENTS

| | | | | | |
|---|---|---|---|---|---|
| 2,613,065 | A | * | 10/1952 | Didier | 165/146 |
| 2,700,598 | A | * | 1/1955 | Odell | 48/198.6 |
| 3,574,302 | A | * | 4/1971 | Csathy | 122/7 R |
| 3,666,682 | A | * | 5/1972 | Muenger | 252/373 |
| 3,882,925 | A | * | 5/1975 | Huber | 165/110 |
| 3,909,299 | A | * | 9/1975 | Corrigan | 422/190 |
| 4,020,898 | A | * | 5/1977 | Grover | 165/104.26 |
| 4,315,540 | A | * | 2/1982 | Moranne | 165/67 |
| 4,621,681 | A | * | 11/1986 | Grover | 165/47 |
| 4,921,681 | A | | 5/1990 | Ozero et al. | |
| 5,156,821 | A | * | 10/1992 | Murayama | 422/191 |
| 5,324,452 | A | * | 6/1994 | Allam et al. | 252/373 |
| 5,382,271 | A | * | 1/1995 | Ng et al. | 48/61 |
| 6,103,143 | A | * | 8/2000 | Sircar et al. | 252/373 |
| 6,180,846 | B1 | * | 1/2001 | Dandekar et al. | 585/443 |
| 6,387,554 | B1 | * | 5/2002 | Verykios | 429/17 |
| 6,497,199 | B2 | * | 12/2002 | Yamada et al. | 122/367.1 |
| 6,497,856 | B1 | * | 12/2002 | Lomax et al. | 423/651 |
| 6,610,260 | B1 | * | 8/2003 | Fairchok et al. | 422/236 |
| 2003/0068261 | A1 | * | 4/2003 | Taheri et al. | 422/197 |

FOREIGN PATENT DOCUMENTS

JP 04240394 A * 8/1992

OTHER PUBLICATIONS

U.S. Appl. No. 10/436,060, filed May 13, 2003, Lomax et al.
U.S. Appl. No. 10/791,746, filed Mar. 4, 2004, Lomax et al.

* cited by examiner

*Primary Examiner*—Tho Duong
(74) *Attorney, Agent, or Firm*—Oblon, Spivak, McClelland, Maier & Neustadt, P.C.

(57) ABSTRACT

A heat exchanger including a passageway having an internal passage adapted to form a first flow path, and an array of conduits having internal passages that collectively form a second flow path. The conduits extend through the internal passage of the passageway, and a first conduit of the array is provided with a lower total heat exchange surface area per unit volume therein than a second conduit of the array. A method of performing chemical processes is provided that includes providing a catalyst bed within the second flow path, and minimizing a temperature differential between a maximum temperature of a fluid in the second flow path and a minimum temperature of the fluid in the second flow path.

44 Claims, 4 Drawing Sheets

HEAT EXCHANGER AND METHOD OF PERFORMING CHEMICAL PROCESSES

BACKGROUND OF THE INVENTION

1. Field of the Invention

The present invention relates generally to heat exchange devices and methods of performing chemical processes using heat exchangers.

2. Discussion of the Background

Chemical processing systems combining heat exchangers and catalytic reactors are well-known in the art. Significant progress has been made in the field of single assemblies that combine heat exchange and reaction functions due to an increased sensitivity to mechanical equipment size and cost. An example of this trend is the advanced hydrogen generating reactor disclosed in U.S. Pat. No. 6,497,856 to Lomax et al., which combines several heat exchangers and reactors into a single mechanical device. Such combined reactors have been advantageously applied to hydrogen generation for fuel cells, although many other applications are possible.

In most catalytic reactors, reaction rates are extremely sensitive to temperature. In some reactions, the actual product distribution and reaction route can also be profoundly affected by small swings in temperature. One problem encountered whenever a large heat exchange array is integrated with a large adiabatic reactor, such as a packed bed or monolithic reactor, is the presence of temperature gradients across the catalyst bed. These temperature gradients necessarily arise in any cross-flow heat exchange structure, such as a baffled tubular heat exchanger or a plate-fin heat exchanger. In traditional systems using separate heat exchangers and reactors, the fluids of different temperatures would be mixed after heat exchange and before being piped to the subsequent reactor. Accordingly, traditional systems did not encounter concerns regarding temperature gradients. However, these systems required more complicated, less compact, heavier equipment with high heat losses as compared to an integrated reactor and heat exchanger.

Referring to FIG. 4, the reactor of the Lomax et al. patent has an inlet for mixed, pre-vaporized fuel and steam 101, which communicates with a plenum 102, which distributes the mixture to the array of reactor tubes 103. The reactor tubes 103 are provided, as is illustrated in the cut-away portion of FIG. 4, with a charge of steam reforming catalyst material 105. This catalyst material 105 may be a loose packing as illustrated, or may be a catalytic coating, or may be a section of monolithically-supported catalyst. Such coated, packed bed, or monolithic catalyst systems are well known to those skilled in the art. The reactor tubes are also provided with a water gas shift catalyst 150, which is located downstream from the steam reforming catalyst 105. The tubes 103 communicate with an outlet plenum 107, which delivers the reformate product to an outlet port 108. The reactor tubes 103 pass through holes in one or more baffles 109. The baffles 109 are chorded to allow fluid to flow around the end of the baffle and along the tube axis through a percentage of the cross-sectional area of the shell. The direction of the chorded side alternates by one hundred and eighty degrees such that fluid is forced to flow substantially perpendicular to the long axis of the tubes 103.

The reactor has a cold air inlet 112 in a shell-side of a water gas shift section, as well as, a hot air outlet 113. Most of the shell-side air is prevented from bypassing the hot air outlet 113 by an unchorded baffle 114, which fits snugly against the shell assembly 110 inner wall. The reactor is further provided in the shell side of a steam reforming section with a hot combustion product inlet 115 and a cooled combustion product outlet 116. The reactor is also provided with an external burner assembly 118. An adiabatic water gas shift reactor 121 is appended to the outlet tube header 106. The reactor employs both baffles 109, as well as, extended heat exchange surfaces, such as a plurality of closely-spaced plate fins 120, on the outer walls of the reactor tubes 103. The fins 120 are attached to all of the reactor tubes 103 in the tube array.

It has been determined that in the example of catalytic water gas shift as taught in the patent to Lomax et al., at temperatures below 350° C. the reaction rate is very slow, while at temperatures above 400° C. the thermodynamically-limited extent of reaction is undesirably low. Worse yet, at temperatures above 450° C. an undesirable side reaction to create methane begins to occur at appreciable rates. Thus, the total preferred operating temperature gradient is less than 50° C., and a gradient above 100° C. is quite undesirable. In the patent to Lomax et al., the feed gas to the catalytic water gas shift reactor is cooled with air that is near room temperature. The cold air used for cooling can cause extremely low temperatures in the zones of the catalytic reactor adjacent to the air inlet. Experience has shown that local temperature gradients of over 200° C. routinely occur, thus causing a significant reduction in reactor performance.

SUMMARY OF THE INVENTION

In an effort to eliminate these disadvantages in the systems described above, the inventor has provided an improved apparatus combining a heat exchanger with a subsequent chemical reactor in order to control thermal gradients in the chemical reactor.

The present invention further advantageously provides a method of performing chemical processes using heat exchangers that are configured to control thermal gradients. For example, the present invention provides a method of performing chemical processes using heat exchange arrays that are configured to minimize thermal gradients and that are combined with chemical reactors.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
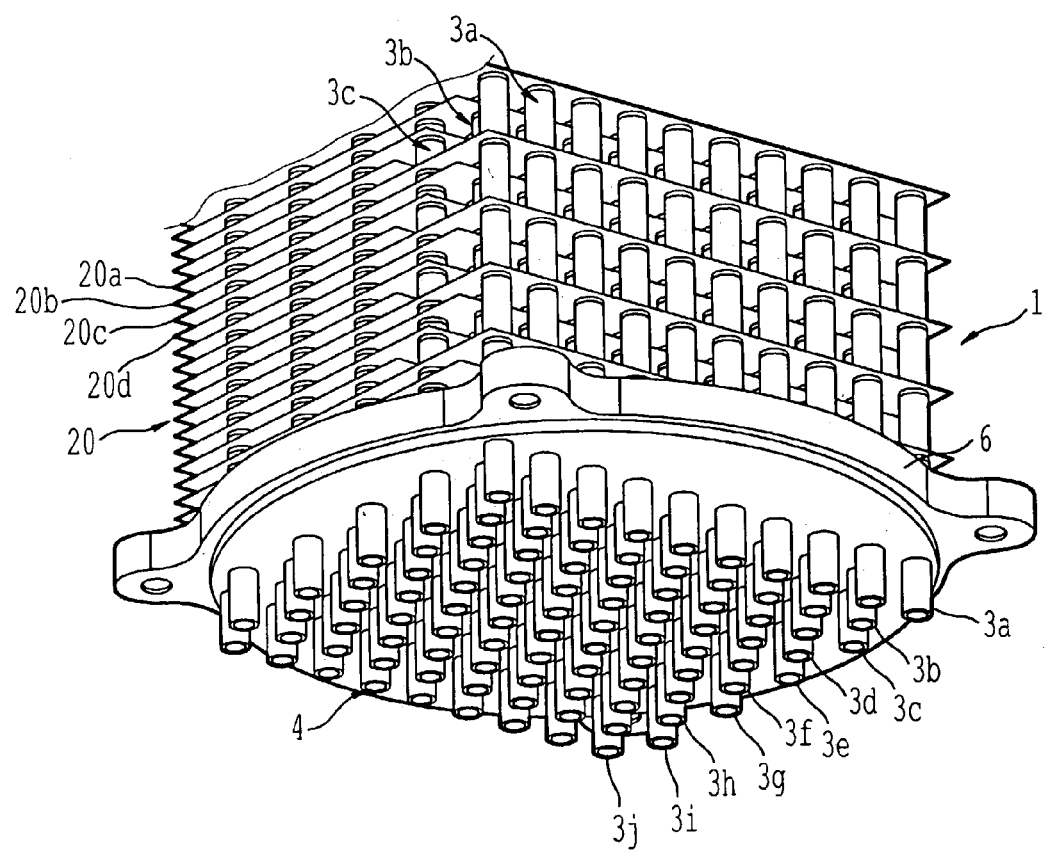
FIG. 1 is a perspective view of a heat exchanger with a tailored heat transfer matrix of the present invention with an outer housing and an appended chemical reactor removed for clarity.

Embodiments of the present invention will be described hereinafter with reference to the accompanying drawings. In the following description, the constituent elements having substantially the same function and arrangement are denoted by the same reference numerals, and repetitive descriptions will be made only when necessary.

Figure 2:
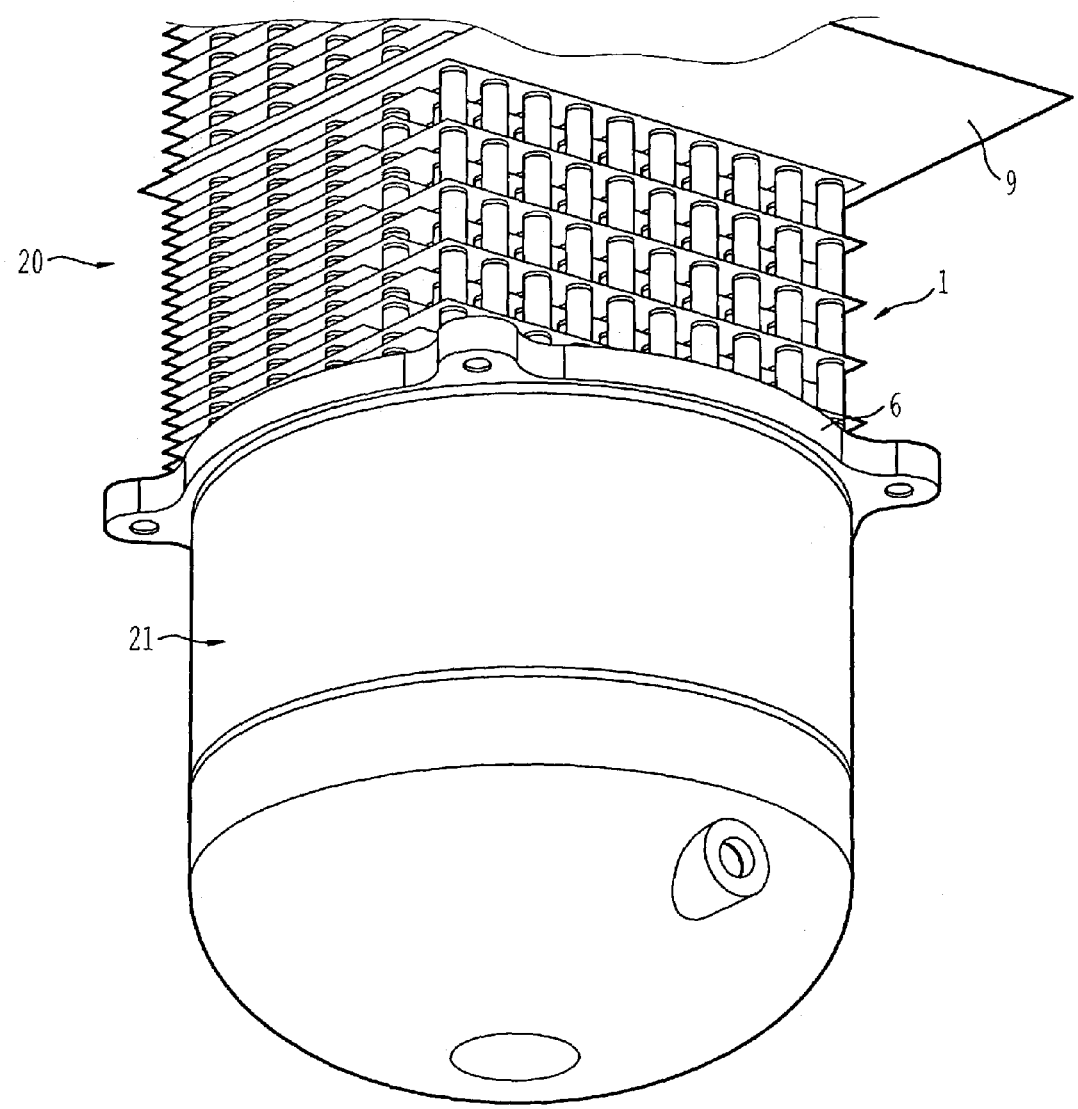
FIG. 2 is a perspective view of the heat exchanger of FIG. 1 with a chemical reactor attached thereto.
Figure 3:
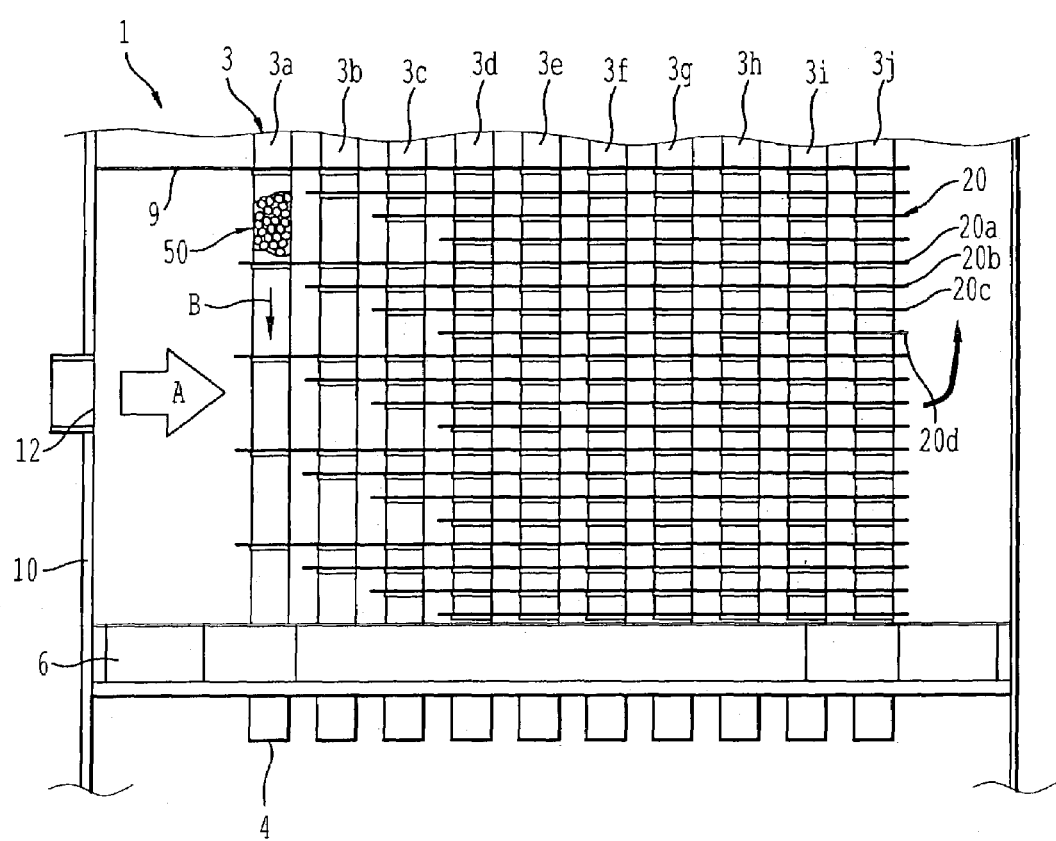
FIG. 3 is a side view of the heat exchanger with a tailored heat transfer matrix of FIG. 1 with an outer housing and an appended chemical reactor removed for clarity.
Figure 4:
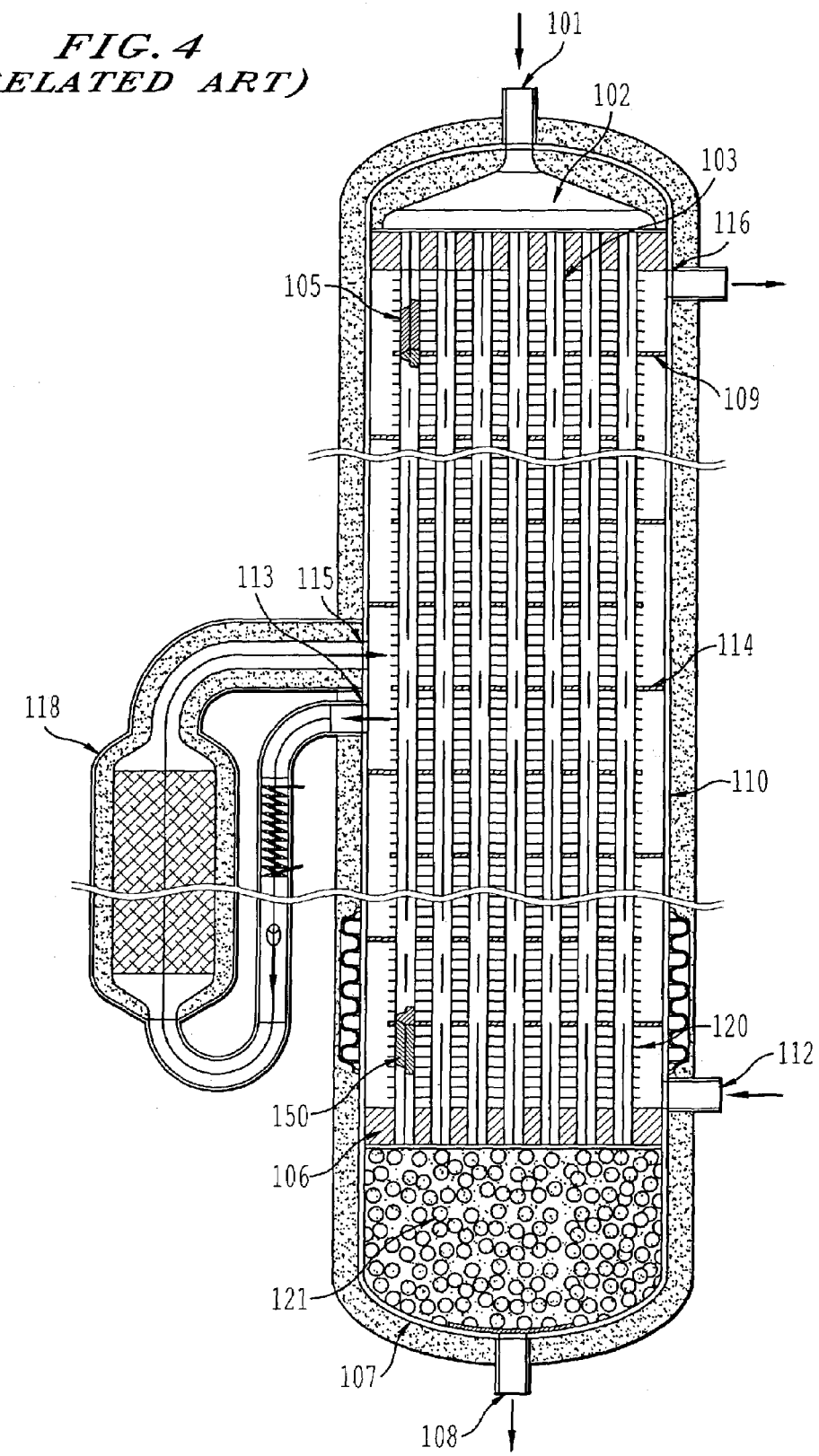
FIG. 4 is a reactor of the Lomax et al. patent with plate fin heat exchange surfaces attached to the tubes on the shell side and an adiabatic water gas shift reactor zone placed after the convectively cooled water gas shift reactor zone.

FIGS. 1–3 depict a heat exchange array 1, which can be used, for example, in a catalytic water gas shift reactor portion of the reactor as taught in the patent to Lomax et al. The heat exchange array 1 includes an array of conduits 3, which are preferably parallel tubes however conduits of various shapes, sizes, and configurations, and conduits of differing shapes and sizes can be used. Although a tubular heat exchange array is shown in FIGS. 1–3, other types of heat exchange arrays may be employed such as plate fin where elongated, essentially-planar fluid passages are formed with attached layers of heat exchange fins. FIGS. 1–2 are depicted with an outer shell assembly or housing 10 (see FIG. 3) removed in order to reveal the array of tubes 3 in a single pass arrangement.

The array of tubes 3 depicted in FIGS. 1–3 includes a plurality of rows of tubes. A row includes two or more aligned tubes. FIG. 3 depicts a side view of the array of tubes 3, which includes ten rows of tubes 3a–3j. The first row of tubes 3a is positioned at a location closest to an inlet 12 in a shell-side of a water gas shift section of the reactor as compared to the remaining rows of tubes 3b–3j. A first fluid flows from the inlet 12 and, due to the configuration of the baffle plate 9, travels along a flow path in the direction indicated by arrow A and weaves through the array of tubes 3 around outer surfaces of the tubes. Based on the flow of the first fluid, the first row of tubes 3a is upstream of the second row of tubes 3b, which is upstream of the third row of tubes, which is upstream of the fourth row of tubes 3d, etc.

A second fluid flows from a common plenum into the tubes 3. The reactor tubes 3 are provided with a water gas shift catalyst bed 50 in the catalytic water gas shift reactor portion of the reactor. The portion of the reactor tubes 3 in the catalytic water gas shift reactor portion form a flow path for the second fluid. The second fluid flows downward as indicated by arrow B in FIG. 3 and exits through tube ends 3 into an attached chemical reactor, such as an adiabatic water gas shift reactor 21, which includes a bed of water gas shift catalyst and is appended to an outlet tube header 6 as depicted in FIG. 2.

The first fluid exchanges heat with the second fluid, which flows substantially perpendicular to the first fluid. The second fluid may heat or cool the first fluid depending upon the configuration of the reactor. The array of tubes 3 is provided with external heat exchange fins 20, which can enhance heat transfer between the first fluid and the second fluid. The fins 20 may be bonded to the reactor tube by brazing, or more preferably by hydraulically expanding the tubes 3 into close contact with the plate fins 20 such that a thermally conductive joint is formed between the fins 20 and the tubes 3 that are in contact therewith.

A finned tubular heat exchanger with rectangular plate fins 20 is shown in FIGS. 1–3, but the practice of the present invention may be easily extended to other fin geometries and types. Further, the fins in the tubular array need not be planar fins (or plate fins) as shown in FIGS. 1–3, but may be individually attached fins (e.g., a series of circular fins attached at intervals along the length of an individual tube), or continuously-applied helical fins, or any other type of heat exchange fin apparent to one skilled in the art. The fins can extend out from a given tube or row of tubes and not be attached to the other rows, thereby not providing thermal conduction between the fin and several rows of tubes.

The present invention advantageously minimizes a temperature differential between a maximum temperature of a fluid in the second flow path (i.e., in any one of the tubes in the array of tubes 3) and a minimum temperature of the fluid in the second flow path by providing tubes in the array of tubes 3 with different predetermined amounts of total heat exchange surface area per unit volume, where the predetermined amounts are dependent upon a location distance of a tube to an inlet 12 of the first flow path indicated by arrow A. The amount of total heat exchange surface area of a given tube can be identified by the total number and size of plate fins that are connected in a thermally conductive manner to that tube, and adding up all of the surface area of the tube and the respective thermally connected fins that are exposed to the first fluid. The total heat exchange surface area is then determined per unit volume of the tube in question, which represents the volume of second fluid provided within the tube in question at any given time. The present invention advantageously varies the amount of heat exchange area per unit volume gradually from the first fluid inlet 12 towards a first fluid outlet such that the rate of heat exchange within the catalytic water gas shift reactor portion of the reactor can be controlled to limit excursions from a desired second fluid outlet temperature.

In the embodiment depicted in FIGS. 1–3, the plate fins 20 are sized so that tubes in row 3a, which is nearest to the inlet 12 of the first fluid (i.e. furthest upstream in the first fluid flow path), are connected in a thermally conductive manner to fewer fins per unit length than the tubes in the next nearest row 3b. In turn, the tubes in row 3b are connected in a thermally conductive manner to fewer fins per unit length than the next nearest row 3c. The tubes in rows 3d–3j are connected in a thermally conductive manner to all of the fins 20, thereby achieving the highest thermal conductivity per unit length of tube.

In the embodiment depicted in FIGS. 1–3, five sets of plate fins 20 are provided in a stacked arrangement. Each set of plate fins 20 includes a first plate fin 20a that is connected in a thermally conductive manner to all of the tubes in rows 3a–3j, a second plate fin 20b that is connected in a thermally conductive manner to all of the tubes in rows 3b–3j, a third plate fin 20c that is connected in a thermally conductive manner to all of the tubes in rows 3c–3j, and a fourth plate fin 20d that is connected in a thermally conductive manner to all of the tubes in rows 3d–3j. Thus, each tube in row 3a is connected to five fin plates along the length of tube that extends through the first fluid flow path, each tube in row 3b is connected to ten fin plates along the length of tube that extends through the first fluid flow path, each tube in row 3c is connected to fifteen fin plates along the length of tube that extends through the first fluid flow path, and each tube in rows 3d–3j is connected to twenty fin plates along the length of tube that extends through the first fluid flow path. Many different variations of the configuration of fin plates depicted in FIGS. 1–3 are possible, as will be readily apparent to one of ordinary skill in the art in light of the disclosure set forth herein. For example, a larger or smaller number of rows can be provided, a larger or smaller number of fins can be provided in the first fluid flow path, a larger or smaller number of sets of fins can be provided or a different configuration of fin lengths can be provided such that the fins are in a different pattern than shown or are not in any particular pattern, and the fins can be configured to have different sizes than those shown whereby the number of fins per unit length is different only for row 3a, or is different for each of rows 3a–3j, or any configuration in between.

By providing less heat exchange area per unit heat exchange volume of tube and/or less heat exchange area per unit length of tube in the rows of tubes nearest the incoming first fluid, the rate of heat exchange between the first and second fluids may be advantageously reduced relative to that obtained in a related-art configuration where all of the heat exchange matrix would possess the same heat exchange area per unit volume. By varying the amount of heat exchange area per unit volume gradually from the inlet 12 of the first fluid towards the outlet of the first fluid, the rate of heat exchange may everywhere be controlled to limit excursions from the desired second fluid outlet temperature. This method has the disadvantage of reducing the overall performance of the heat exchanger relative to related art configurations with constant heat transfer matrix properties, but advantageously provides almost complete control over the temperature gradient at the second fluid passage outlet 4. This advantage can be achieved without provision of any mixing dead volume, or any fluid mixing means such as a static turbulator or a motor-actuated mixer. All of these mixing devices result in a system larger in volume, higher in complexity, and, with the actuated system, lower in reliability than achieved in the present invention.

FIGS. 1–3 depict a particularly-preferred embodiment where plate fins 20 having a varying number of rows are placed around an array of tubes 3 in a repeating pattern. This embodiment is readily assembled as the fins 20 may be provided with self-spacing collars. FIG. 1 shows the plate fins spaced widely apart for clarity, with their extended collars not in contact. In a more preferred embodiment the fin collars are in contact between each fin, thus providing uniform spacing of the fins and thus uniform fluid flow. A repeating pattern of fins 20 also provides advantageously uniform fluid flow across the entire area of the first fluid flow path. Other preferred embodiments achieve a similar flow distribution by installing evenly spaced individual fins, but with much higher assembly difficult, or by installing continually-finned tube with a different fin spacing for each row. For plate-fin heat exchange matrices, the same effect may be achieved by installing strips of fin of varying fins per inch or with varying degrees of surface enhancement to achieve the same gradual variation in heat transfer performance.

FIG. 2 depicts the heat exchange matrix of the present invention with an attached chemical reaction vessel 21. The reaction vessel may have any shape, although a vessel having a round cross section is shown in FIG. 2. The chemical reactor may be catalytic or uncatalyzed, and may be provided with solid catalyst supports, mass transfer media, a catalyst monolith, or any other typical chemical reactor internal structure known in the art. It is a particular advantage of the present invention that no mixing means is required before the chemical reaction zone.

The apparatus of the present invention may be configured to create either a specified uniform temperature, or to create a preferred non-uniform gradient. This may be accomplished by treating each row of tubes, or differential element of flow in a plate-fin heat transfer matrix, as a separate heat exchanger for design purposes. The amount of heat transfer area per unit volume of heat exchange matrix may be varied to create the preferred temperature gradient using calculations known to those skilled in the art.

The apparatus of the present invention is especially well-suited to use in reactors integrating catalytic water gas shift with heat exchange. It is especially advantageous in unitary reactors of the type described in the Lomax, et al. patent.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A heat exchanger comprising:
   a passageway having an internal passage adapted to form a first flow path in a multi-pass arrangement;
   an array of conduits having internal passages that collectively form a second flow path, said array of conduits extending through said internal passage of said passageway;
   a first heat transfer fin provided within said passageway in a first pass of said multi-pass arrangement; and
   a second heat transfer fin provided within said passageway in said first pass,
   wherein a first conduit of said array of conduits extends from an inlet manifold to an outlet manifold,
   wherein a second conduit of said array of conduits extends from said inlet manifold to said outlet manifold,
   wherein said first conduit is provided with a lower total heat exchange surface area per unit volume therein than said second conduit at portions thereof corresponding to said first pass, and wherein said first conduit and said second conduit are provided with substantially equal total heat exchange surface area per unit volume at portions thereof corresponding to a second pass of said multi-pass arrangement, and
   wherein said first heat transfer fin is attached to exterior surfaces of said first conduit and said second conduit, and said second heat transfer fin is attached to the exterior surface of said second conduit and is not attached to said exterior surface of said first conduit.

2. The heat exchanger according to claim 1, wherein said first conduit is provided with a lower total heat exchange surface area per unit length than said second conduit.

3. The heat exchanger according to claim 1, wherein said first conduit extends through said internal passage of said passageway at a location upstream of said second conduit in said first flow path.

4. The heat exchanger according to claim 3, wherein said first conduit is provided with a lower number of heat transfer fins per unit length attached to an outer surface thereof than said second conduit.

5. The heat exchanger according to claim 3, wherein said first conduit is attached to heat transfer fins having a lower total surface area than said second conduit.

6. The heat exchanger according to claim 1, wherein said array of conduits includes a first row of conduits including said first conduit and a second row of conduits including said second conduit, said first row of conduits extending through said internal passage of said passageway at a location upstream of said second row of conduits in said first flow path.

7. The heat exchanger according to claim 6, wherein said first row of conduits have a lower number of heat transfer fins per unit length attached thereto than said second row of conduits.

8. The heat exchanger according to claim 6, wherein said first row of conduits is attached to heat transfer fins having a lower total surface area than said second row of conduits.

9. The heat exchanger according to claim 6, wherein each conduit in said first row of conduits is provided with a lower total heat exchange surface area per unit volume therein than each conduit in said second row of conduits.

10. The heat exchanger according to claim 9, wherein said array of conduits further includes a third row of conduits, said second row of conduits extending through said internal passage of said passageway at a location upstream of said third row of conduits in said first flow path, and wherein each conduit in said second row of conduits is provided with a lower total heat exchange surface area per unit volume therein than each conduit in said third row of conduits.

11. A heat exchanger comprising:
a passageway having an internal passage adapted to form a first flow path;
an array of conduits having internal passages that collectively form a second flow path, said array of conduits extending from an inlet manifold through said internal passage of said passageway to an outlet manifold in a single pass arrangement, said second flow path having a catalyst bed therein; and
means for minimizing a temperature differential between a maximum temperature of a fluid in said second flow path and a minimum temperature of the fluid in said second flow path,
wherein said array of conduits includes conduits with different predetermined amounts of total heat exchange surface area per unit volume.

12. A heat exchanger comprising:
a passageway having an internal passage adapted to form a first flow path in a multi-pass arrangement;
a first row of conduits with respective internal passages, said first row of conduits extending through said internal passage of said passageway from an inlet manifold to an outlet manifold;
a second row of conduits with respective internal passages, said second row of conduits extending through said internal passage of said passageway from said inlet manifold to said outlet manifold, said internal passages of said first row of conduits and said internal passages of said second row of conduits collectively form a second flow path;
a first heat transfer fin provided within said passageway in a first pass of said multi-pass arrangement; and
a second heat transfer fin provided within said passageway in said first pass, wherein said first row of conduits has a lower total heat exchange surface area per unit length than said second row of conduits at portions thereof corresponding to said first pass, and wherein said first conduit and said second conduit are provided with substantially equal total heat exchange surface area per unit volume at portions thereof corresponding to a second pass of said multi-pass arrangement, and
wherein said first heat transfer fin is attached to exterior surfaces of said first row of conduits and said second row of conduits, and said second heat transfer fin is attached to the exterior surface of said second row of conduits and is not attached to said exterior surface of said first row of conduits.

13. The heat exchanger according to claim 12, wherein each conduit in said first row of conduits is provided with a lower total heat exchange surface area per unit volume therein than each conduit in said second row of conduits.

14. The heat exchanger according to claim 13, wherein said array of conduits further includes a third row of conduits, said second row of conduits extending through said internal passage of said passageway at a location upstream of said third row of conduits in said first flow path, and wherein each conduit in said second row of conduits is provided with a lower total heat exchange surface area per unit volume therein than each conduit in said third row of conduits.

15. A heat exchanger comprising:
a passageway having an internal passage adapted to form a first flow path in a multi-pass arrangement;
a first row of conduits with respective internal passages, said first row of conduits extending through said internal passage of said passageway from an inlet manifold to an outlet manifold;
a second row of conduits with respective internal passages, said second row of conduits extending through said internal passage of said passageway from said inlet manifold to said outlet manifold, said internal passages of said first row of conduits and said internal passages of said second row of conduits collectively form a second flow path; and
means for minimizing a temperature differential between a maximum temperature of a fluid in said second flow path and a minimum temperature of the fluid in said second flow path,
wherein said means provides said first row of conduits with a lower total heat exchange surface area per unit length than said second row of conduits at portions thereof corresponding to said first pass, and wherein said means provides said first conduit and said second conduit with substantially equal total heat exchange surface area per unit volume at portions thereof corresponding to a second pass of said multi-pass arrangement.

16. A chemical processing system comprising:
a housing;
a passageway provided within said housing and having an internal passage adapted to form a first flow path; and
an array of conduits provided within said housing and having internal passages that collectively form a second flow path, said array of conduits extending through said internal passage of said passageway in a single pass arrangement from an inlet manifold with an inlet of said housing to an outlet manifold with an outlet of said housing, said second flow path having a catalyst bed therein,
wherein a first conduit of said array of conduits extends from said inlet manifold to said outlet manifold,
wherein a second conduit of said array of conduits extends from said inlet manifold to said outlet manifold, and
wherein said first conduit is provided with a lower total heat exchange surface area per unit volume therein than said second conduit.

17. The chemical processing system according to claim 16, wherein said first conduit is provided with a lower total heat exchange surface area per unit length than said second conduit.

18. The chemical processing system according to claim 16, wherein said first conduit extends through said internal passage of said passageway at a location upstream of said second conduit in said first flow path.

19. The chemical processing system according to claim 16,
wherein said first conduit extends through said internal passage of said passageway at a location upstream of said second conduit in said first flow path,
further comprising heat transfer fins provided within said passageway and attached to exterior surfaces of said first conduit and said second conduit, wherein said first conduit is provided with a lower number of heat transfer fins per unit length attached to an outer surface thereof than said second conduit.

20. The chemical processing system according to claim 16,
wherein said first conduit extends through said internal passage of said passageway at a location upstream of said second conduit in said first flow path,
further comprising heat transfer fins provided within said passageway and attached to exterior surfaces of said first conduit and said second conduit, wherein said first conduit is attached to heat transfer fins having a lower total surface area than said second conduit.

21. The chemical processing system according to claim 16, further comprising an adiabatic water gas shift reactor appended to said housing, wherein said adiabatic water gas shift reactor includes a bed of water gas shift catalyst being in fluid connection to an outlet of said second flow path.

22. A chemical processing system comprising:
a housing;
a passageway provided within said housing and having an internal passage adapted to form a first flow path;
an array of conduits provided within said housing and having internal passages that collectively form a second flow path, said array of conduits extending from an inlet manifold through said internal passage of said passageway to an outlet manifold, in a single passage arrangement said second flow path having a catalyst bed therein; and
means for minimizing a temperature differential between a maximum temperature of a fluid in said second flow path and a minimum temperature of the fluid in said second flow path.

23. A chemical processing system comprising:
a housing;
a passageway provided within said housing and having an internal passage adapted to form a first flow path;
a first row of conduits with respective internal passages, said first row of conduits being provided within said housing, said first row of conduits extending through said internal passage of said passageway in a single pass arrangement from an inlet manifold with an inlet of said housing to an outlet manifold with an outlet of said housing; and
a second row of conduits with respective internal passages, said second row of conduits being provided within said housing, said second row of conduits extending through said internal passage of said passageway in a single pass arrangement from said inlet manifold to said outlet manifold, said internal passages of said first row of conduits and said internal passages of said second row of conduits collectively form a second flow path, said second flow path having a catalyst bed therein,
wherein said first row of conduits has a lower total heat exchange surface area per unit length than said second row of conduits.

24. The chemical processing system according to claim 23, wherein said first row of conduits extends through said internal passage of said passageway at a location upstream of said second row of conduits in said first flow path.

25. The chemical processing system according to claim 23,
wherein said first row of conduits extends through said internal passage of said passageway at a location upstream of said second row of conduits in said first flow path,
further comprising heat transfer fins provided within said passageway and attached to exterior surfaces of said first row of conduits and said second row of conduits, wherein said first row of conduits have a lower number of heat transfer fins per unit length attached thereto than said second row of conduits.

26. The chemical processing system according to claim 23,
wherein said first row of conduits extends through said internal passage of said passageway at a location upstream of said second row of conduits in said first flow path,
further comprising heat transfer fins provided within said passageway and attached to exterior surfaces of said first row of conduits and said second row of conduits, wherein said first row of conduits is attached to heat transfer fins having a lower total surface area than said second row of conduits.

27. The chemical processing system according to claim 23, further comprising an adiabatic water gas shift reactor appended to said housing, wherein said adiabatic water gas shift reactor includes a bed of water gas shift catalyst being in fluid connection to an outlet of said second flow path.

28. A chemical processing system comprising:
a housing;
a passageway provided within said housing and having an internal passage adapted to form a first flow path;
a first row of conduits with respective internal passages, said first row of conduits being provided within said housing, said first row of conduits extending from an inlet manifold through said internal passage of said passageway to an outlet manifold; in single passage arrangement
a second row of conduits with respective internal passages, said second row of conduits being provided within said housing, said second row of conduits extending from said inlet manifold through said internal passage of said passageway to said outlet manifold, said internal passages of said first row of conduits and said internal passages of said second row of conduits collectively form a second flow path, said second flow path having a catalyst bed therein; and
means for minimizing a temperature differential between a maximum temperature of a fluid in said second flow path and a minimum temperature of the fluid in said second flow path.

29. A method of performing chemical processes using a heat exchanger including a passageway having an internal passage adapted to form a first flow path, and an array of conduits having internal passages that collectively form a second flow path, wherein the array of conduits extend through the internal passage of the passageway, wherein a first conduit of the array of conduits extends in a single pass arrangement from an inlet manifold with an inlet of a housing to an outlet manifold with an outlet of the housing, wherein a second conduit of the array of conduits extends in a single pass arrangement from the inlet manifold to the outlet manifold, wherein the first conduit is provided with a lower total heat exchange surface area per unit volume therein than the second conduit, and wherein the second flow path has a catalyst bed therein, said method comprising the steps of:
providing a first fluid flow through the first flow path, wherein the first conduit extends through the internal passage of the passageway at a location upstream of the second conduit in the first flow path; and providing a second fluid flow through the second flow path and through the catalyst bed.

30. The method of performing chemical processes according to claim 29, wherein the first conduit is provided with a lower total heat exchange surface area per unit length than the second conduit.

31. The method of performing chemical processes according to claim 29,
wherein heat transfer fins are provided within the passageway and attached to exterior surfaces of the first conduit and the second conduit, and wherein the first conduit is provided with a lower number of heat transfer fins per unit length attached to an outer surface thereof than the second conduit.

32. The method of performing chemical processes according to claim 29,
wherein heat transfer fins are provided within the passageway and attached to exterior surfaces of the first conduit and the second conduit, and wherein the first conduit is attached to heat transfer fins having a lower total surface area than the second conduit.

33. A method of performing chemical processes using a heat exchanger including a passageway having an internal passage adapted to form a first flow path, a first row of conduits with respective internal passages, and a second row of conduits with respective internal passages, wherein the first row of conduits and the second row of conduits extend through the internal passage of the passageway, wherein the internal passages of the first row of conduits and the internal passages of the second row of conduits collectively form a second flow path, wherein the second flow path has a catalyst bed therein, wherein the first row of conduits extends in a single pass arrangement from an inlet manifold with an inlet of a housing to an outlet manifold with an outlet of the housing, wherein the second row of conduits extends in a single pass arrangement from the inlet manifold to the outlet manifold, and wherein the first row of conduits has a lower total heat exchange surface area per unit length than the second row of conduits, said method comprising the steps of:
providing a first fluid flow through the first flow path, wherein the first row of conduits extend through the internal passage of the passageway at a location upstream of the second row of conduits in the first flow path; and
providing a second fluid flow through the second flow path and through the catalyst bed.

34. The method of performing chemical processes according to claim 33,
wherein heat transfer fins are provided within the passageway and attached to exterior surfaces of the first row of conduits and the second row of conduits, and wherein the first row of conduits have a lower number of heat transfer fins per unit length attached thereto than the second row of conduits.

35. The method of performing chemical processes according to claim 33,
wherein heat transfer fins are provided within the passageway and attached to exterior surfaces of the first row of conduits and the second row of conduits, and wherein the first row of conduits is attached to heat transfer fins having a lower total surface area than the second row of conduits.

36. The method of performing chemical processes according to claim 33, further comprising the step of providing an adiabatic water gas shift reactor that includes a bed of water gas shift catalyst in fluid connection to an outlet of said second flow path.

37. A method of performing chemical processes, comprising the steps of:
providing a first flow path within a passageway having an internal passage;
providing a second flow path collectively formed by an array of conduits having internal passages, the array of conduits extending through the internal passage of the passageway in a single pass arrangement from an inlet manifold with an inlet of a housing to an outlet manifold with an outlet of the housing, wherein a first conduit of the array of conduits extends from the inlet manifold to the outlet manifold, and wherein a second conduit of the array of conduits extends from the inlet manifold to the outlet manifold;
providing a catalyst bed within the second flow path;
providing a first fluid flow through the first flow path;
providing a second fluid flow through the second flow path and through the catalyst bed; and
minimizing a temperature differential between a maximum temperature of the second fluid flow in the second flow path and a minimum temperature of the second fluid flow in the second flow path,
wherein said minimizing step includes providing conduits in the array of conduits with different predetermined amounts of total heat exchange surface area per unit volume.

38. The method of performing chemical processes according to claim 37, wherein the predetermined amounts are dependent upon a location distance of a conduit to an inlet of the first flow path.

39. The method of performing chemical processes according to claim 38, wherein the predetermined amounts increase as the location distance from the inlet increases.

40. The method of performing chemical processes according to claim 37, wherein said minimizing step includes providing conduits in the array of conduits with different predetermined amounts of total heat exchange surface area per unit length, and wherein the predetermined amounts are dependent upon a location distance of a conduit to an inlet of the first flow path.

41. The method of performing chemical processes according to claim 40, wherein the predetermined amounts increase as the location distance from the inlet increases.

42. The method of performing chemical processes according to claim 37, further comprising the step of providing a first conduit of the array of conduits at a location upstream of a second conduit of the array of conduits in the first flow path, wherein said minimizing step includes providing the first conduit with a lower total heat exchange surface area per unit volume therein than the second conduit.

43. The method of performing chemical processes according to claim 37, further comprising the step of providing a first conduit of the array of conduits at a location upstream of a second conduit of the array of conduits in the first flow path, wherein said minimizing step includes providing the first conduit with a lower total heat exchange surface area per unit length than the second conduit.

44. The method of performing chemical processes according to claim 37, further comprising the step of providing an adiabatic water gas shift reactor that includes a bed of water gas shift catalyst in fluid connection to an outlet of said second flow path.

* * * * *